April 28, 1936.   R. E. SAUZEDDE   2,038,608
HUB BRAKE
Filed April 8, 1929   2 Sheets-Sheet 1

Inventor
René E. Sauzedde
BY
Harness, Dickey & Pierce
ATTORNEYS

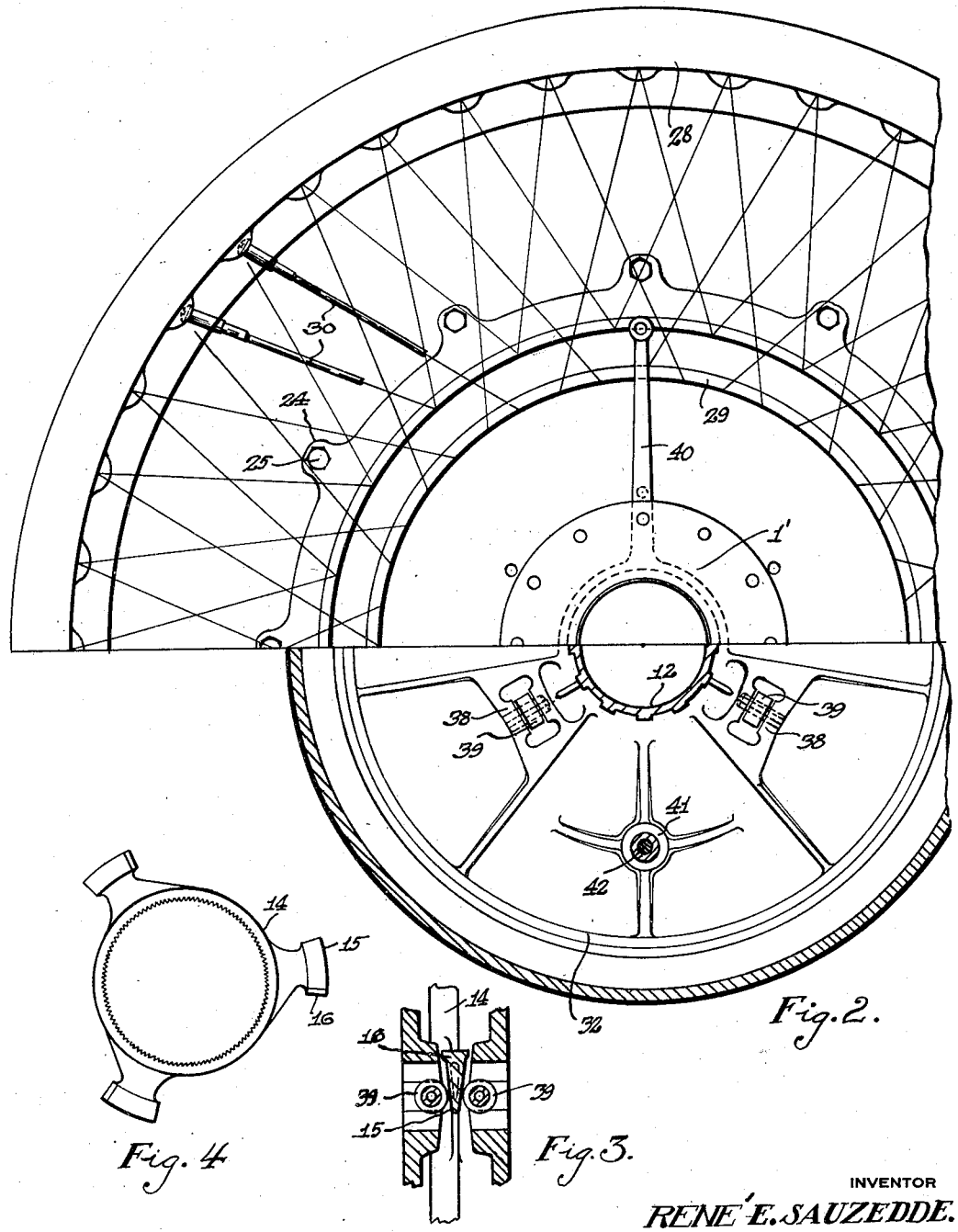

Patented Apr. 28, 1936

2,038,608

UNITED STATES PATENT OFFICE 2,038,608

HUB BRAKE

René E. Sauzedde, Detroit, Mich., assignor, by mesne assignments, to Detroit Hydrostatic Brake Corporation, a corporation of Michigan Application April 8, 1929, Serial No. 353,365

18 Claims. (Cl. 188—18)

The object of the present invention is to provide a brake wheel having a brake formed as a component part thereof. The housing for the brake is a hollow central closed drum structure in the nature of a hub or body member which is joined by spokes, disks or the like to the rim of a wheel and carries or has formed therein a braking surface or opposite braking surfaces.

Another object of the invention is to provide a wheel of this character which may readily be substituted for the conventional wheel on aircraft, without reconstruction or modification of the standard axle assembly of the aircraft.

It is a further object of the invention to mount the braking mechanism symmetrically of the rim, with respect to both axes, so that a well balanced wheel will be provided. The braking mechanism is enclosed as already indicated, and is operated by cams and a linkage extending to the point of control.

The invention is fully disclosed by way of example in the following description and in the accompanying drawings in which—

Fig. 2 is an elevation thereof, partly in section on the line 2—2 of Figure 1;

Fig. 3 is a detail transverse section of the cam member and parts associated therewith; and Fig. 4 is a side elevation of the cam member.

Reference to these views will now be made by use of like characters which are employed to designate corresponding parts throughout.

Figure 1:
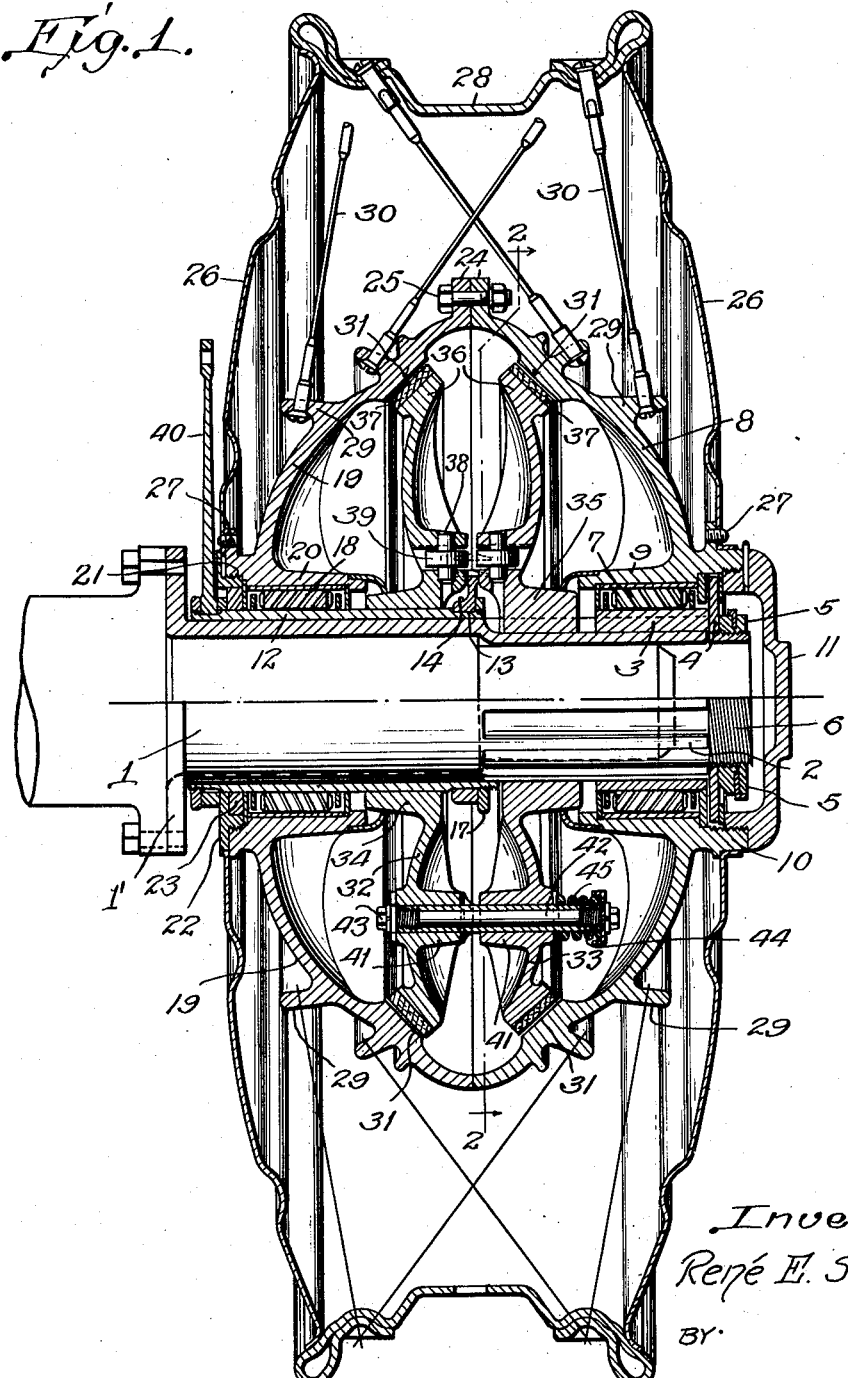
Figure 1 is a diametrical section of a wheel constructed according to the invention.

In Figure 1 is illustrated an axle 1 having at one end a number of splines 2 whereby certain parts of the brake structure may be driven thereto. Over the splined end is mounted a bearing race 3 which is also splined and held by a washer 4 and a lock nut 5 mounted on the threaded end 6 of the axle 1. The race 3 accommodates roller bearings 7 around which is mounted a semi-section 8 of a brake body or housing which will presently be described in greater detail. This member has a central boss 9 fitted over the roller bearings 7 and terminating in a threaded end 10 to which a hub cap 11 is applied.

The remaining end of the axle 1 is formed with an axle flange 1'. In mounting the device on the axle of a vehicle, the axle 1 slips over the vehicle axle, and the flange 1' is secured to the brake support flange which is provided as standard construction on the axle of an aeroplane. Thus, if a wheel of present construction is to be replaced by a brake wheel of the type described herein, it is merely necessary to detach the former wheel from the brake support flange of the vehicle axle, slip the axle 1, carrying the novel brake mechanism over such vehicle axle, and secure the flange 1' to the brake support flange.

Over the plain portion of the axle adjacent the spline portion is fitted a rotatable sleeve 12 having one end serrated exteriorly at 13. Over this end is fitted an internally serrated cam ring 14 carrying a series of equidistant cam members in the nature of wedges 15 with a somewhat enlarged head 16. A ring 17 is threaded on the same end of the sleeve 12 in order to retain the ring 14. A series of roller bearings 18 is provided around the sleeve 12 in the same manner as the bearings 7, and over these bearings is rotatably mounted a body section 19 substantially similar to section 8 and forming an enclosure therewith. The section 19 also has a central boss 20 which immediately surrounds the roller bearings 18 and is formed with an internally threaded end 21 into which is screwed a retaining ring 22 for holding a packing ring 23.

The sections 8 and 19, oppositely concave and together constituting a substantially spherical or spheroidal shell are formed with a series of coinciding marginal lugs 24 which are bolted together as at 25 to form a permanent housing for braking members mounted for relative expansion therein. Circular side plates or disks 26, if provided, may be attached to the outer ends of the sections by suitable securing means 27 and engage a wheel rim 28 at their margins. The body sections 8 and 19 are formed at suitable points with fins 29, suitable for both a cooling and a reinforcing effect and/or as anchors for wire or other rim-carrying members, such as spokes 30. It may now be noted that the body structure is symmetrical with the rim on both axes and that the spokes 30 are also symmetrically arranged so that a well balanced wheel structure is provided. If desired, disks may be used instead of spokes for connecting the body to the rim.

Each of the body sections has an annular but preferably lateral, extensive and conical or concave braking surface 31, preferably opposite one or more of the mentioned fins disposed near its outer periphery. A pair of brake elements such as shoes 32 and 33 are supported back to back adjacent the oppositely concave braking surfaces and around the axle 1 at opposite sides of the parting plane of the inner body. These shoes may be expanded and released by axial movement and the parts associated therewith are obviously assembled before the light and substantially semi-spherical conductive sections 8 and 19 are assembled, as will readily be apparent to one skilled in the art. The section 32 has a central boss 34 which may be loose on the collar 12, but the boss 35 of the section 33 is toothed internally to lock into the splines 2 of the axle 1.

The outer periphery 36 of each of the shoes or other brake members constituting a pair is conical and parallel and adjacent to the corresponding and complemental braking surface 31 faced thereby. Any suitable brake lining 37 may be applied to the conical surfaces of the shoes. At three equidistant points, the shoes are formed with bearings 38 in which are journalled opposed rollers 39. Although three such sets of rollers are illustrated, the number may be varied at will, or other means might be used to operate the shoes or like pairs of members by separating or expansive movements therebetween, relatively to hub members 8 and 19, or the like. In the present instance the three sets of rollers are located in a circle concentric with the axle 1. The spacing of the sets of rollers is similar to the spacing of the cam members 15, and the latter are adapted to enter between the rollers and to serve as means, common thereto, to spread the shoes on rotation of the sleeve 12. The sleeve is actuated by means of a lever 40 fixed exteriorly thereto and connected by suitable linkage to the operating point.

For an automatic restorative effect, resilient means may be employed. For example, the brake shoes may be formed with a number of opposed and aligned bosses 41 through which are passed spring-carrying pins 42. One end of each pin is shown as held by a nut 43 against the outer face of one of the shoes, and the other end may extend through a cup or cap 44 in which is received one end of a spring 45 surrounding the pin and having its other end engaging the outer surface of the other shoe. The pins are preferably located in a circular series concentric with the axle 1. By means of this arrangement the brake shoes are normally drawn together and away from the brake surfaces 31. By actuating the lever 40, the cams 15 may be caused to enter between the rollers 39 and to spread the brake shoes so that they come into operative engagement with the surfaces 31. On retracting the cams from between the rollers, the springs 45 will draw the brake shoes away from the brake surfaces as already stated. It will now be seen that, contrary to present practice, the brake is not offset from the central plane of the wheel, but is symmetrical to both axes of the rim and functions also as a part of the wheel body. It will be seen that the pressure applied to the operating lever is transmitted in its entirety to the brake shoes at a uniform pressure on both shoes.

Although a specific embodiment of the invention has been illustrated and described, it will be apparent that various alterations in the details of construction may be made without departing from the scope of the invention as indicated by the appended claims.

What I claim is:—

1. In a brake and wheel assembly adapted to be mounted on a vehicle axle, a tubular, axle receiving member, a rim, a substantially spheroidal body adapted to be mounted on the axle-receiving member and disposed substantially within the edges of the rim, a braking mechanism in the body, and a flange at one end of the axle receiving member, said axle member being adapted to slip over the axle, and the flange being adapted for attachment to a brake supporting member.

2. A brake drum suitable for use as a wheel hub, comprising a pair of approximately semi-spherical members secured together to form a hollow structure, said drum carrying a plurality of external spaced-apart annular flanges relatively positioned to provide for anchoring the inner ends of spokes designed to position the rim of the wheel.

3. A brake drum suitable for use as a wheel hub, comprising a pair of approximately semi-spherical members secured together to form a hollow structure, said members having a braking surface interiorly formed thereon, said drum carrying a plurality of external spaced-apart annular flanges relatively positioned to provide for anchoring the inner ends of spokes designed to position the rim of the wheel.

4. A brake drum suitable for use as a wheel hub and having a plurality of spaced-apart annular cooling fins formed thereon serving as spoke anchoring means, said fins projecting in directions substantially normal to directions in which the spokes of a wire wheel normally extend.

5. In combination, a tubular axle receiving member adapted to be releasably secured on an axle in a non-rotatable manner, a pair of complementary drum sections rotatably mounted on the axle receiving member, said sections having braking surfaces, brake shoes non-rotatably but axially slidable on the axle receiving member and adapted to cooperate with the braking surfaces and means rotatably mounted on the axle receiving member for moving the shoes against the braking surfaces.

6. In combination, a tubular axle receiving member adapted to be releasably secured on an axle in a non-rotatable manner, a pair of complementary drum sections rotatably mounted on the axle receiving member, said sections having braking surfaces, brake shoes non-rotatably but axially slidable on the axle receiving member and adapted to cooperate with the braking surfaces and means rotatably mounted on the axle receiving member for moving the shoes against the braking surfaces, all of said parts being unitarily associated whereby one assembly may be quickly substituted for another on a wheel axle.

7. In combination, a tubular axle receiving member adapted to be releasably secured on an axle in a non-rotatable manner, a pair of complementary drum sections rotatably mounted on the axle receiving member, said sections having braking surfaces, brake shoes non-rotatably but axially slidable on the axle receiving member and adapted to cooperate with the braking surfaces and means rotatably mounted on the axle receiving member for moving the shoes against the braking surfaces, the axle receiving member having an end flange adapted to be releasably secured to a non-rotatable member on a wheel axle.

8. In combination, a tubular axle receiving member adapted to be releasably secured on an axle in a non-rotatable manner, a pair of complementary drum sections rotatably mounted on the axle receiving member, said sections having braking surfaces, brake shoes non-rotatably but axially slidable on the axle receiving member and adapted to cooperate with the braking surfaces and means rotatably mounted on the axle receiving member for moving the shoes against the braking surfaces, said braking surfaces being inclined to the axis of the axle member.

9. In combination, an axle receiving member adapted to be releasably secured on a wheel axle in a non-rotatable manner, a rotatable sleeve on the axle-receiving member, complementary brake drum sections mounted rotatably on the axle receiving member and sleeve, brake shoes mounted non-rotatably but axially slidable on the axle receiving member, means non-rotatably mounted on the sleeve for moving the brake shoes against the braking surfaces on the brake drum sections and means for rotating the sleeves to apply the brakes.

10. A brake drum suitable for use as a wheel hub, which is of substantially spheroidal contour, and a plurality of spaced-apart annular flanges on the outer surface of the drum that are axially displaced to accommodate a plurality of axially spaced spoke ends adapted to be secured to such projections respectively.

11. A brake drum suitable for use as a wheel hub, which is of substantially spheroidal contour, a plurality of spaced-apart annular flanges on the outer surface of the drum that are axially displaced to accommodate a plurality of axially spaced spoke ends adapted to be secured to the projections respectively, said flanges being directed at different angles to the drum surface to correspond with the directions of the spokes.

12. A brake drum suitable for use as a wheel hub, which is of spheroidal contour, said drum having a braking surface on its inner periphery, and an annular projecting flange on the outer surface of the drum and located in alignment with the braking surface, for the purpose of more rapidly dissipating heat away from such surface.

13. A brake drum suitable for use as a wheel hub, which is of generally spheroidal contour, said drum having a braking surface on its inner periphery, an annular projecting flange on the outer surface of the drum and in alignment with the braking surface, said flange serving to dissipate heat more rapidly away from the braking surface, and also being adapted to secure a spoke end to the drum.

14. In combination, a tubular axle receiving member adapted to be releasably secured to an axle in a non-rotatable manner, a pair of complementary drum sections rotatably mounted on the axle receiving member, said sections having braking surfaces, brake shoes non-rotatably but axially slidable on the axle receiving member and adapted to cooperate with the braking surfaces, and means rotatably mounted on the axle receiving member for moving the shoes apart and against the braking surfaces, all of said parts being unitarily associated whereby one assembly may be quickly substituted for another on a wheel axle.

15. In combination, a tubular axle receiving member adapted to be releasably secured to an axle in a non-rotatable manner, a pair of complementary drum sections rotatably mounted on the axle receiving member, said sections having braking surfaces, brake shoes non-rotatably but axially slidable on the axle receiving member and adapted to cooperate with the braking surfaces, and means rotatably mounted on the axle receiving member for moving the shoes apart and against the braking surfaces, the axle receiving member having an end flange adapted to be releasably secured to a non-rotatable member on a wheel axle.

16. In combination, a tubular axle receiving member adapted to be releasably secured to an axle in a relatively non-rotatable manner, a pair of complementary drum sections rotatably mounted on the axle receiving member, having a braking surface, a brake shoe adapted to cooperate with the braking surface on the drum, and means for moving the shoe against the braking surface, all of said parts being unitarily associated whereby one assembly may be quickly substituted for another on a wheel axle.

17. In combination, a tubular axle receiving member adapted to be releasably secured to an axle in a relatively non-rotatable manner, a pair of complementary drum sections rotatably mounted on the axle receiving member, said sections having braking surfaces, brake shoes non-rotatably mounted but axially slidable on the axle receiving member and adapted to cooperate with the braking surfaces, and means for moving the shoes against the braking surfaces, all of said parts being unitarily associated whereby one assembly may be quickly substituted for another on a wheel axle.

18. A wheel comprising a tubular axle receiving member, a housing brake drum mounted on the tubular receiving member, tire supporting means mounted solely on the brake drum, said drum having an interior braking surface housed thereby, a brake shoe within the drum for cooperating with the braking surface, and means for moving the brake shoe against the braking surface, all of said parts being removable from the axle as a unit so that one assembly may be quickly substituted for another on a wheel axle.

RENÉ E. SAUZEDDE.